UNITED STATES PATENT OFFICE.

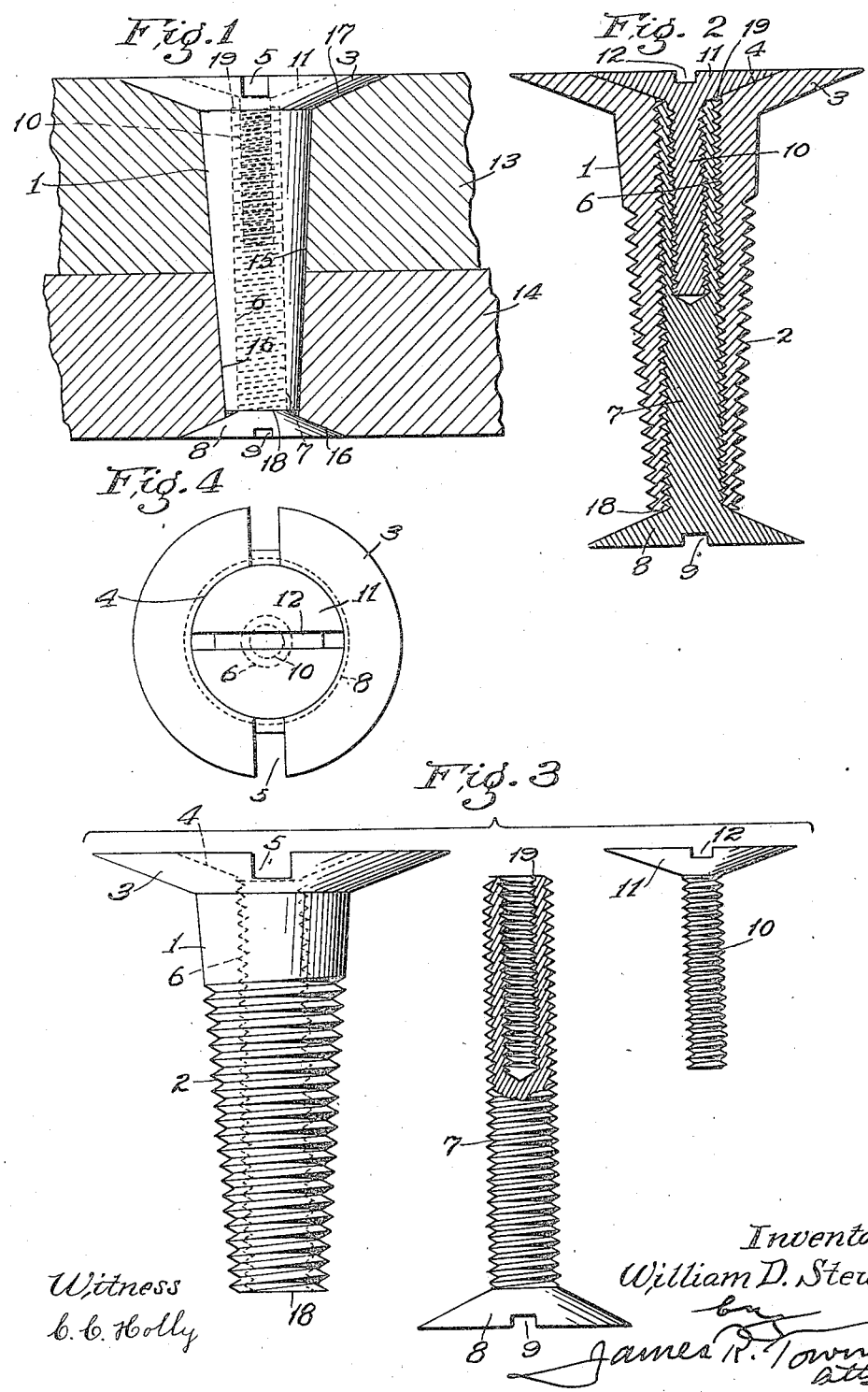

WILLIAM DANIEL STEWART, OF LOS ANGELES, CALIFORNIA.

TELESCOPIC LOCK SCREW-BOLT OR FASTENER.

1,194,792. Specification of Letters Patent. Patented Aug. 15, 1916.

Application filed March 8, 1915. Serial No. 12,820.

*To all whom it may concern:*

Be it known that I, WILLIAM DANIEL STEWART, a citizen of the United States, residing in the city of Los Angeles, county of Los Angeles, State of California, have invented a new and useful Improvement in Telescopic Lock Screw-Bolts or Fasteners, of which the following is a specification:

This invention relates to means for fastening together parts of framework and other structures and is adapted to clamp the parts together in such a manner that they will not loosen or come apart, and is also adapted to be secured against coming apart irrespective of whether it is loosely or fixedly related to the part or parts with which it is connected.

An object of the invention is to provide an adjustable bolt that is positively locked and provided with a head at each end so as to tightly draw together two or more parts through which the fastening means extend.

Another object is to provide a device of this kind having heads adapted to be flush with the outer surfaces of the parts secured together.

The invention may be constructed in various shapes and sizes and will be illustrated herein in forms I at present deem most desirable.

The accompanying drawings illustrate the invention.

Figure 1 is a side elevation of the newly-invented telescopic screw-bolt in place to fasten together two parts, fragments of which are shown. Fig. 2 is an axial section of a screw-bolt constructed in accordance with this invention, and assembled as though in use, the external member being threaded. Fig. 3 is a view of the three members of said screw-bolt detached from each other. The second or intermediate member is broken to show its hollow internally threaded construction. Fig. 4 is a view of the lock end of the screw-bolt assembled. Dotted lines indicate the interior construction.

The external member is shown with a taper body 1 and said taper body is shown in Figs. 2 and 3 as provided with screw-threads 2. Said external member is provided with a head 3 which is shown as a counter-sink head; and said counter-sink head, which is tapered on the screw side, is counter-sunk at 4 on the outside; and is provided with means, as a screw-driver slot 5, to be engaged by an instrument by which it may turned or held stationary. The external member is provided with an axial bore 6 extending from end to end of said member, and said bore is threaded to receive a tubular externally and internally threaded second or intermediate member 7 provided with a head 8 and with a screw-driver slot 9. In practical use this second member of the assembled telescopic screw-bolt is screwed into the bore 6 of the external member. The inner member 10 is an externally-threaded screw having a countersink head 11 and a screw-driver slot 12 in said head.

The pieces 13, 14 to be fastened together are provided with holes 15 to receive the body of the external member of the bolt, and may also be provided with countersinks 16, 17 to receive the counter-sink heads 8 and 3. When the external member has been inserted into the holes in the parts to be fastened together, the second member of the bolt will be screwed into the external member until the heads 8 and 3 are firmly seated in the counter-sinks therefor, as shown in Fig. 1.

In this position the head 8 may or may not contact with the tip end 18 of the external member of the bolt, depending on the thickness of the material separating the heads 3 and 8. In any case the open end 19 of the second member will terminate near enough the counter-sink 4 of the external member to receive the inner screw 10. Prior to inserting the screw 10 in place the external member and the second member will be screwed firmly home, or to a desired position. Then the inner screw will be inserted into the end 19 of the intermediate or second member 7 and will be screwed home until the counter-sink head 11 is seated in the counter-sink 4 and its outer face is flush with the outer face of the counter-sunk head 3; and the various threads will co-act to bind the members together and prevent the same from becoming loosened or unscrewed.

A screw-driver, not shown, inserted into the screw-driver slot 5 may be employed to turn the body 1 to seat it in case said body is threaded, or to hold it from turning while the second member 7 is being screwed into body 1 in case said body 1 is not threaded.

It is thus seen that I have provided an improved screw or bolt that can be used whenever the opposite sides of the parts or part on which it is used may be exposed so as to get at both ends of the screw or bolt, and that the fastening can be permanently locked, so that friction or use will not unloosen or unlock the same; and that said improved bolt is adapted to fasten together wood, glass, metal, parts of machinery, etc., and to insure non-loosening of the same by use or wear; and that where the counter-sink head construction with counter-sunk holes to receive the heads is provided, the fastening will have a flush surface on the top and the bottom thereof; and that this improved bolt eliminates the projecting heads or ends and nuts of bolts as ordinarily constructed, thus giving a flush surface for both sides of the parts fastened together; and that the bolt is adjustable to fasten different thicknesses of parts together throughout a range considerably greater than the length of the external part, or main body of the bolt, the surplus length being in all instances used in the connection between the heads that are at the ends of the bolt; and that this improved fastening can be used wherever a nail, bolt, screw, peg or other fastening could be used provided both sides of the parts to be secured together are exposed; and that the fastening insures permanent relative position of the parts it secures together.

By reference to the drawings it will be noted that the several members are variously threaded, the threads being of different fineness; and consequently, when each is screwed home firmly all are securely locked.

I claim:

1. A telescopic lock screw-bolt comprising an external member having a head and also having a longitudinal screw-threaded bore that extends from end to end of said member; an externally and internally-threaded tubular second member provided with a head and adapted to screw into the bore of the external member; and a screw provided with a head and adapted to be screwed into the threaded end of the second member; the head of the screw engaging with the external member.

2. A telescopic lock screw-bolt comprising an external member having a head and a taper body, and a longitudinally screw-threaded bore that extends from end to end of said member; an externally and internally-threaded tubular second member provided with a head and adapted to screw into the bore of the external member; and a screw provided with a head and adapted to be screwed into the threaded end of the second member; the head of the screw engaging with the external member.

3. A telescopic lock screw-bolt comprising an external member having a head and a taper screw-threaded body, and a longitudinal screw-threaded bore that extends from end to end of said member; an externally and internally-threaded tubular second member provided with a head and adapted to screw into the bore of the external member; and a screw provided with a head and adapted to be screwed into the threaded end of the second member; the head of the screw engaging with the external member.

4. A lock screw bolt comprising a hollow member provided with a head and a threaded bore; a headed and externally and internally threaded member in the bore; and a headed screw adapted to be screwed into the second member, the head of said screw contacting with said hollow member; said members being variously threaded for the purpose set forth.

5. A telescopic lock screw-bolt comprising an external member having a counter-sunk head and also having a longitudinal screw-threaded bore that extends from end to end of said member; an externally and internally-threaded tubular second member provided with a head and adapted to screw into the bore of the external member; and a screw provided with a head and adapted to be screwed into the threaded end of the second member; the head of the screw seating in said counter-sink and engaging with the external member.

WILLIAM DANIEL STEWART.